3,634,501
SODIUM ACRYLATE AND SODIUM METHACRYLATE FROM PROPYLENE AND ISOBUTYLENE
Thomas A. Schenach, San Clemente, and Frederick F. Caserio, Jr., Laguna Beach, Calif., assignors to Atlantic Richfield Company, Philadelphia, Pa.
No Drawing. Filed July 3, 1969, Ser. No. 839,044
Int. Cl. C07c 57/04
U.S. Cl. 260—533 N          4 Claims

ABSTRACT OF THE DISCLOSURE

Sodium acrylate and sodium methacrylate are produced by the oxidation of allylpalladium complexes of propylene and isobutylene according to the following reaction scheme:

(a)

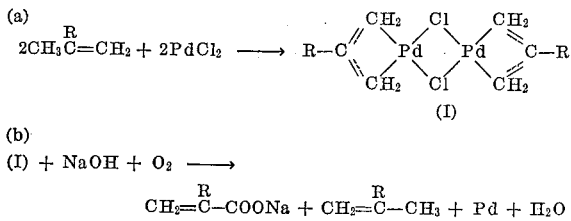

(b)
(I) + NaOH + O$_2$ ⟶

$$CH_2=\overset{R}{C}-COONa + CH_2=\overset{R}{C}-CH_3 + Pd + H_2O$$

wherein R may be hydrogen or methyl.

BACKGROUND OF THE INVENTION

Field of the invention

This invention relates to the synthesis of sodium salts of acrylic acid and methacrylic acid by the oxidation of allylpalladium complexes of propylene and isobutylene.

Description of the prior art

The formation of allylpalladium complexes as shown in the following equation is known:

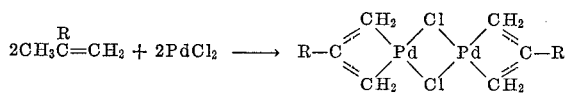

in which R is hydrogen or methyl. See, for example, W. T. Dent, J. Chem. Soc., 1964, page 1588. Huttel, et al., Chem. Ber., 94, P766 (1961) describe hydrolysis of the π-allylpalladium complex of isobutylene to methacrolein. We have now discovered that these allylpalladium complexes of propylene and isobutylene may be air oxidized in basic solution to the respective acid salts, sodium acrylate and sodium methacrylate. Sodium salts of acrylic acid and methacrylic acid are useful as flocculating, thickening, and suspending agents in aqueous systems and are useful as intermediates in the preparation of acrylic and methacrylic resins. The object of this invention is to provide an improved process for synthesizing these useful compounds.

SUMMARY OF THE INVENTION

The present invention contemplates the synthesis of sodium acrylate and sodium methacrylate by the cyclic two-step process of complexing either propylene or isobutylene to form the respective allylpalladium complex, air oxidizing the complex in the presence of sodium or potassium hydroxide, or equivalent base, to form sodium acrylate and sodium methacrylate and unoxidized olefin. The olefin is recycled to the start of the process and the palladium is regenerated in the conventional manner using benzoquinone or CuCl$_2$ and oxygen. The object of this invention, therefore, is to provide an improved process for producing sodium salts of acrylic and methacrylic acid.

A more specific object of this invention is to provide a process for producing sodium acrylate and sodium methacrylate by the oxidation of π-allylpalladium complexes of propylene and isobutylene.

Other objects of the invention will be apparent from the specification which follows:

DESCRIPTION OF THE PREFERRED EMBODIMENTS

Although propylene and isobutylene can be oxidized by oxygen to acrylic and methacrylic acids, the vapor phase processes that have been developed require high temperatures, 300° or more and are not particularly selective. Acetic acid and the oxides of carbon are the major by-products. We have developed a liquid phase method for the oxidation of olefins, such as propylene and isobutylene, to the sodium salts of the corresponding unsaturated acids, acrylic and methacrylic acids, via π-allylpalladium complexes.

Our process may be described by the following equations:

(a)

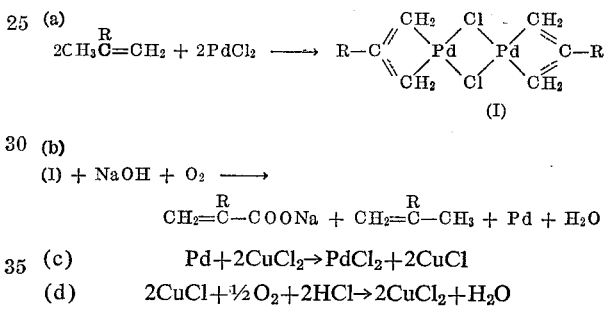

(b)
(I) + NaOH + O$_2$ ⟶

$$CH_2=\overset{R}{C}-COONa + CH_2=\overset{R}{C}-CH_3 + Pd + H_2O$$

(c)    Pd + 2CuCl$_2$ → PdCl$_2$ + 2CuCl
(d)    2CuCl + ½O$_2$ + 2HCl → 2CuCl$_2$ + H$_2$O

As previously indicated, the formation of allylpalladium complexes from the olefins of interest with palladium chloride is a known reaction. Similarly, regeneration of palladium chloride as shown in Equations (c) and (d) is known. A similar reaction using benzoquinone rather than cupric chloride, is also known.

Insofar as we know, however, the oxidation of an allylpalladium complex directly to the unsaturated acid, or its salt, has not previously been accomplished.

In our preliminary laboratory work, the yields of the sodium acrylate and sodium methacrylate have been low, in about the 10 percent range, but most of the complex is converted back to the starting olefin, which can be recycled and is, therefore, not wasted as is the case with the vapor phase oxidation of olefins to acrylic and methacrylic acids.

The reaction is carried out in aqueous basic solution. Solutions of sodium hydroxide, potassium hydroxide, etc. are suitable. Aqueous solutions of hydroxides of the Group I-A and Group II-A metals and other strongly basic metal hydroxides are suitable. Sodium hydroxide is preferred because of its availability and convenience in handling.

The allylpalladium complex, which is soluble in the aqueous sodium hydroxide solution, is air oxidized in the temperature range of from about 50° C. to about 110° C. The temperature range of about 80° C. to 95° C. is preferred.

Oxygen is most conveniently added simply as air, but pure oxygen may be used if desired. The amount of oxygen required is not critical and may be added simply by saturating the aqueous solution. It is perhaps advantageous to provide a source of air continuously as, for example, by bubbling air through the aqueous reaction solution.

The oxidation of the allylpalladium complexes of propylene and isobutylene have been verified experimentally but any olefin capable of forming an allylpalladium complex will be converted to the corresponding unsaturated acid salt or ketone.

The concentration of sodium hydroxide is not critical but the process is believed to be most efficient when the amount of sodium hydroxides slightly exceeds two times the amount of palladium chloride in the reaction medium. Palladium chloride in concentrations up to 4 weight percent may be used. The general range of 1 to 2 weight percent chloride is most conveniently used.

The effects of pressure has not been investigated but, except perhaps as a method for maintaining oxygen saturation in the aqueous medium, it is not believed that the reaction is significantly effected by pressure. Our experiments were carried out at atmospheric pressure. The following experiments are illustrative of the reaction of this invention.

EXAMPLE I

A solution of 3 millimoles of 2-methallylpalladium chloride dimer in 25 ml. of 0.25 N. aqueous sodium hydroxide was warmed carefully in air to 95° C. 4.5 millimoles of isobutylene was evolved and the solution darkened rapidly. When gas evolution was complete, the reaction mixture was filtered to separate the precipitate of palladium and palladium salts from the liquid medium. The liquid was then evaporated to dryness and analyzed. A yield of 0.4 millimoles sodium methacrylate was obtained.

EXAMPLE II

In a similar experiment, a solution of 2.5 millimoles allylpalladium chloride dimer in 0.16 N sodium hydroxide was decomposed at 100° C. yielding propylene and 0.6 millimoles sodium acrylate.

The reaction may be carried out in a single vessel by introducing an isobutylene-air mixture into a solution of cupric and palladium chlorides, and metering in enough sodium hydroxide to keep the pH slightly basic. Regeneration of the palladium chloride would be accomplished in the normal manner.

A basic medium is necessary, however; as we have been unable to oxidize allylpalladium complexes to the corresponding unsaturated acids in neutral or acid medium. The solution need not be strongly basic, however, and any system for maintaining the reaction medium in a basic condition will be satisfactory.

Other oxidants, e.g. chromate, in this system have resulted in trace quantities of unsaturated acids. The yields of the desired product, however, have been almost insignificant and the reaction system becomes exceedingly complex making it quite difficult to recover the valuable palladium compounds.

The essential novelty of this invention, as will be apparent from the foregoing, resides in the oxidation of $\pi$-allylpalladium complexes of propylene and isobutylene to form the salts of the unsaturated acrylic and methacrylic acids. Various modifications of the procedures and materials described hereinbefore will be apparent from the description to those skilled in the art and it is expected that certain obvious modifications will be made without departing from the spirit and scope of the invention as defined in the following claims.

We claim:

1. The process of preparing salts of acrylic or methacrylic acids comprising the oxidation of $\pi$-allylpalladium complexes of propylene or isobutylene with oxygen in an aqueous solution of a hydroxide of a metal selected from the group consisting of Group I–A metals.

2. The process of claim 1 wherein the reaction is carried out from about 50° C. to about 110° C.

3. The process of claim 2 wherein the temperature is from about 80° C. to about 95° C.

4. The process of claim 1 wherein the metal is sodium.

References Cited

FOREIGN PATENTS

| | | |
|---|---|---|
| 6503115 | 9/1965 | Netherlands. |
| 1,195,754 | 7/1965 | Germany. |
| 6515550 | 6/1966 | Netherlands. |

LORRAINE A. WEINBERGER, Primary Examiner

R. D. KELLY, Assistant Examiner